United States Patent
Liang et al.

[11] Patent Number: 5,965,967
[45] Date of Patent: Oct. 12, 1999

[54] ROTOR FOR AN ELECTRICAL MACHINE

[75] Inventors: Feng Liang, Canton; John Michael Miller, Saline; Xingyi Xu, Canton, all of Mich.

[73] Assignee: Ford Global Technologies, Inc., Dearborn, Mich.

[21] Appl. No.: 09/110,353

[22] Filed: Jul. 6, 1998

[51] Int. Cl.⁶ .......................... H02K 19/22; H02K 1/22

[52] U.S. Cl. ...................... 310/263; 310/261; 310/156; 310/181; 29/596; 29/598

[58] Field of Search .................. 310/263, 156, 310/258, 254, 181, 159, 261; 29/596, 598

[56] References Cited

U.S. PATENT DOCUMENTS

| | | | |
|---|---|---|---|
| 3,346,749 | 10/1967 | Shafranek | 310/263 |
| 3,392,294 | 7/1968 | Campbell | 310/263 |
| 3,411,027 | 11/1968 | Rosenberg | 310/181 |
| 3,553,510 | 1/1971 | Howey | 310/156 |
| 3,555,327 | 1/1971 | Terry | 310/168 |
| 4,433,261 | 2/1984 | Nashiki et al. | 310/156 |
| 4,584,496 | 4/1986 | Frister | 310/60 R |
| 4,855,630 | 8/1989 | Cole | 310/156 |
| 4,882,515 | 11/1989 | Radomski | 310/263 |
| 4,930,201 | 6/1990 | Brown | 29/598 |
| 4,959,577 | 9/1990 | Radomski | 310/263 |
| 4,972,114 | 11/1990 | Frister | 310/263 |
| 4,980,595 | 12/1990 | Arora | 310/263 |
| 5,047,680 | 9/1991 | Torok | 310/156 |
| 5,130,595 | 7/1992 | Arora | 310/268 |
| 5,132,581 | 7/1992 | Kusase | 310/263 |
| 5,177,391 | 1/1993 | Kusase | 310/263 |
| 5,298,827 | 3/1994 | Sugiyama | 310/156 |
| 5,382,862 | 1/1995 | Ward et al. | 310/263 |
| 5,543,676 | 8/1996 | York et al. | 310/263 |

*Primary Examiner*—Nestor Ramirez
*Assistant Examiner*—Tran N Nguyen
*Attorney, Agent, or Firm*—Mark S. Sparschu

[57] ABSTRACT

A "claw pole" or Lundell rotor has permanent magnets included therein, each permanent magnet disposed between an adjacent pair of pole fingers. The permanent magnets each have a magnetization polarity at an angle between radial and tangential with respect to the axis of rotation of the rotor.

20 Claims, 2 Drawing Sheets

ROTOR FOR AN ELECTRICAL MACHINE

Background of the Invention

1. Field of the Invention

The present invention relates to electrical machines, and more particularly to rotors having wound-field and permanent magnet excitation.

2. Description of the Related Art

The demand for electrical power in automobiles is continually increasing. At the same time, space available for packaging electrical an electrical generator in an automobile is generally decreasing. Also, demands for higher efficiency and higher electrical output at idle are increasing.

In an attempt to meet all of these requirements, several known designs employ a "hybrid" alternator design in which a traditional wound-field rotor is supplemented with permanent magnets. One such design is disclosed in U.S. Pat. No. 4,959,577, issued to Radomski (hereinafter "the '577 patent").

In the '577 patent, permanent magnets are disposed between the fingers of a "claw pole", or Lundell, rotor. The magnets are magnetized in a tangential direction with respect to the rotor's axis of rotation.

Although the design of the '577 patent can provide advantages over standard Lundell rotors, the tangential magnetization of the permanent magnets may not make optimal use of the expensive permanent magnets. That is, pure tangential magnetization may miss opportunities to have some direct linking of permanent magnet flux with the stator windings. Such linking may provide benefits in the form of higher electrical output and higher power density (i.e., power output per unit volume of the alternator) of the alternator.

Therefore, a design which can take better advantage of permanent magnets used in a "hybrid" rotor can provide advantages over the prior art.

SUMMARY OF THE INVENTION

The present invention provides a rotor for an electrical machine, the rotor having an axis of rotation and comprising a first pole piece having a plurality of axially-extending first pole fingers and a second pole piece having a plurality of axially-extending second pole fingers, the first pole fingers alternately intermeshed with the second pole fingers. The rotor also includes a field coil in electromagnetic communication with the first pole piece and the second pole piece which when energized magnetizes the first pole fingers and the second pole fingers. Further, the rotor comprises a plurality of permanent magnets, each disposed between a first pole finger and an adjacent second pole finger and having a magnetization polarity at an angle between radial and tangential with respect to the axis of rotation of the rotor.

In another aspect, the present invention provides a rotor for an electrical machine, the rotor having an axis of rotation and comprising a first pole piece having a plurality of axially-extending first pole fingers and a second pole piece having a plurality of axially-extending second pole fingers, the first pole fingers alternately intermeshed with the second pole fingers. The rotor also includes a field coil in electromagnetic communication with the first pole piece and the second pole piece which when energized magnetizes the first pole fingers and the second pole fingers. Further, the rotor comprises a plurality of permanent magnets, each disposed between a first pole finger and an adjacent second pole finger and having a radially-outward surface and an adjacent tangentially-facing surface of a first electromagnetic polarity and having a radially-inward surface and an adjacent tangentially-facing surface of an opposite magnetic polarity.

The present invention also provides a method of manufacturing a rotor for an electrical machine, the rotor having a first pole piece with a plurality of first axially-extending pole fingers and a second pole piece with a plurality of second axially-extending pole fingers and an axis of rotation. The method comprises assembling the first pole piece and the second pole piece with the first pole fingers alternately intermeshed with the second pole fingers and at least one permanent magnet disposed between each first pole finger and an adjacent second pole finger. The method also includes magnetizing the permanent magnets to each have a magnetization polarity with an angle between radial and tangential with respect to the axis of rotation of the rotor.

DETAILED DESCRIPTION OF THE PREFERRED EMBODIMENT

Figure 1:
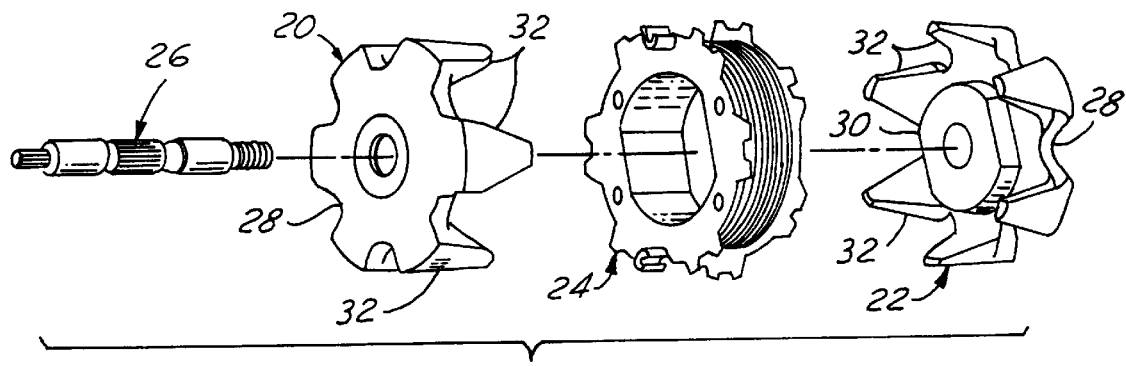
FIG. 1 is an exploded view of the relevant components of a "claw pole", or Lundell, rotor.

Refer first to FIG. 1. Illustrated there are the relevant components of a known Lundell rotor, including pole pieces 20 and 22 and field coil 24. These components are mounted for rotation on shaft 26. Pole pieces 20 and 22 each include a disk-shaped body 28, a hub 30 and a plurality of axially-extending pole fingers 32. As is typical in a Lundell alternator, field coil 24 of the embodiment of the present invention hereinafter described is preferably driven by unidirectional current controlled by a voltage regulator.

Figure 2:
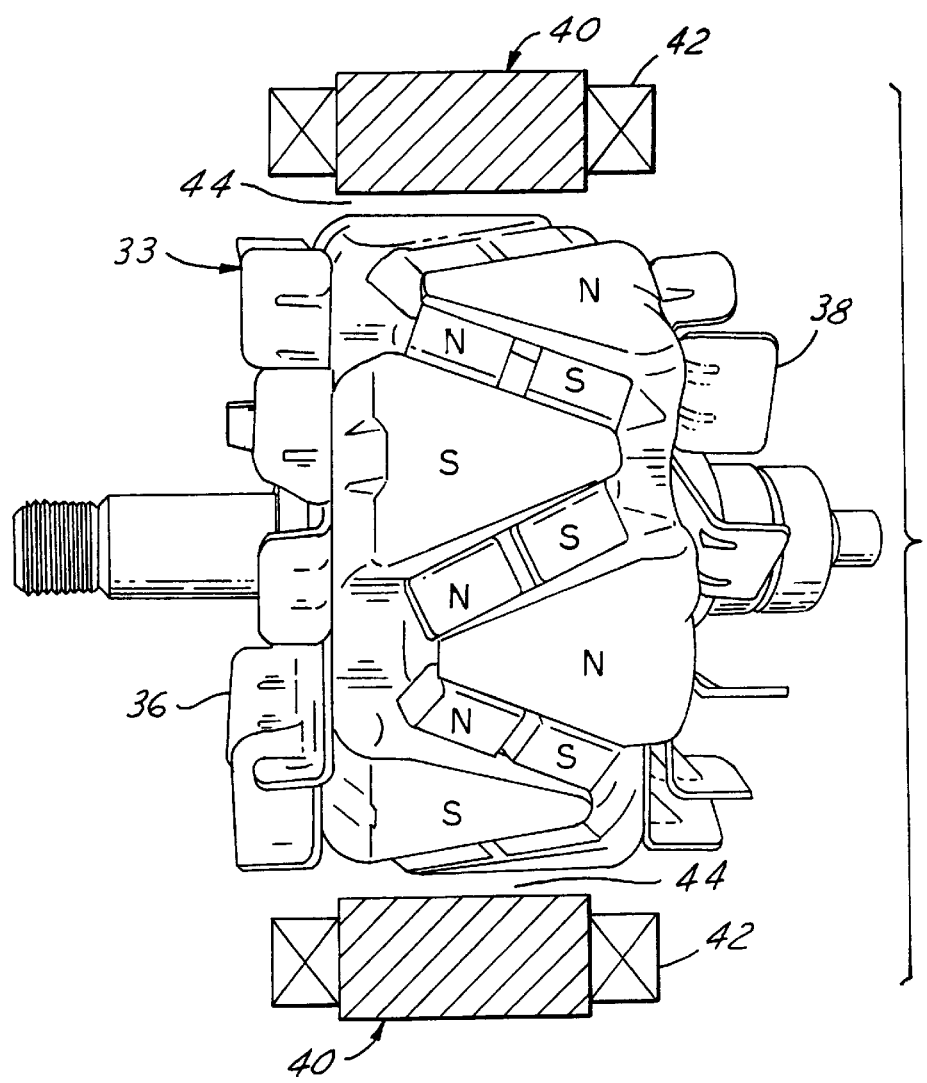
FIG. 2 is a side view of a rotor according to the present invention and of a corresponding stator 40 of an alternator.
Figure 3:
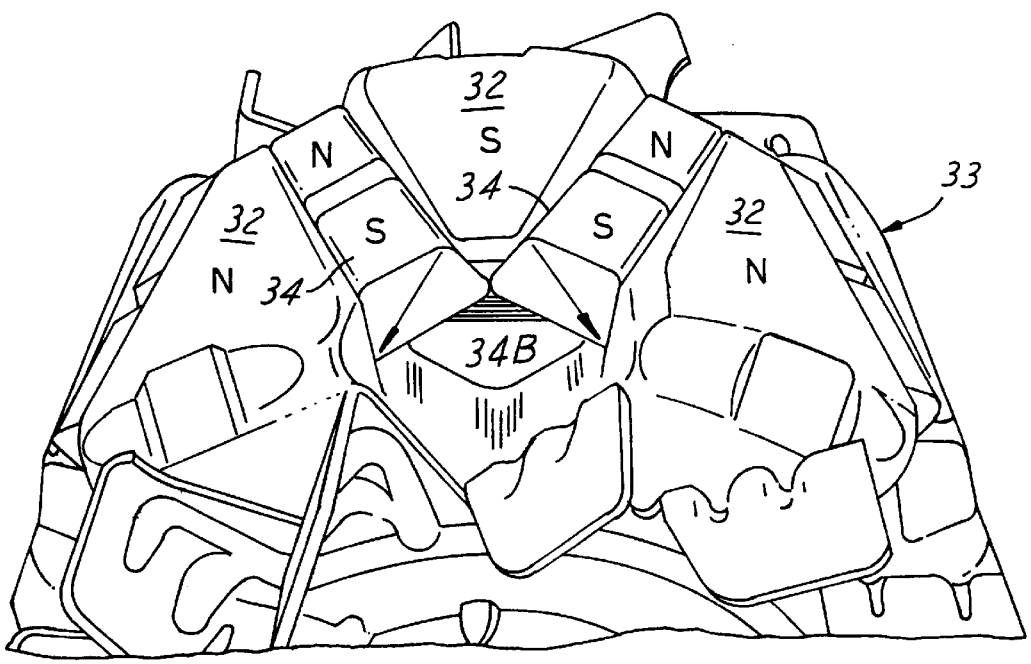
FIGS. 3 and 4 are partial end views of the rotor of FIG. 2, from opposite ends of the rotor.
Figure 4:
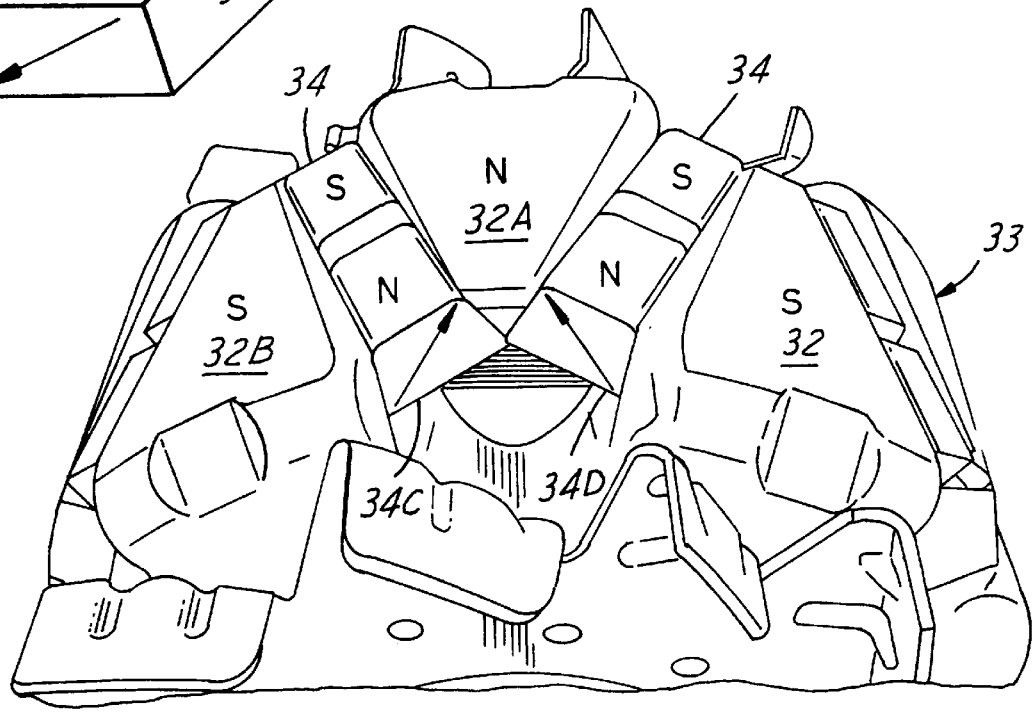

Refer additionally to FIGS. 2, 3 and 4. These figures each illustrate a rotor 33 according to one embodiment of the present invention. The rotor includes known pole pieces 20 and 22. Disposed between pole fingers 32 are permanent magnets 34. Each permanent magnet 34 is preferably mounted to its two adjacent pole fingers 32 by adhesive or by another suitable fastening method. FIGS. 2–4 also illustrate fans 36 and 38, which are preferably stamped steel fans attached to pole pieces 20 and 22, respectively, and well-known in the art. Further, FIG. 2 illustrates in cross-section stator 40 of the electrical machine, including stator windings 42. Rotor 33 and stator 40 are separated by an air gap 44.

It should be noted that in FIGS. 2–4, surfaces having a north magnetic polarity, whether through being magnetized by field coil 24 or by being permanently magnetized are labeled "N"; surfaces having south magnetic polarity are labeled "S".

Figure 5:
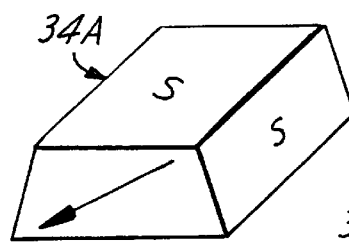
FIG. 5 is a perspective view of permanent magnet 34A of FIG. 3.

Magnetization polarity of permanent magnets 34 is best illustrated in FIGS. 3–5. Permanent magnets 34 are magnetized with a polarity which runs diagonally across their cross sections, as is shown by the arrows on permanent magnets 34A–34D. Thus, for example taking permanent magnet 34A, the radially-outward surface is of south magnetic polarity, as is the adjacent surface which faces tangentially to the right (as viewed in FIG. 3). The radially-inward surface and the adjacent surface which faces tangentially to the left are of north magnetic polarity. FIG. 5 shows permanent magnet 34A removed from rotor 33.

As another example, taking permanent magnet 34C, the radially-outward surface and the surface facing tangentially to the right (as viewed in FIG. 4) are of north magnetic polarity. The radially-inward surface and the adjacent surface which faces tangentially to the left are of south magnetic polarity.

There are several benefits to this design with respect to a design wherein permanent magnets 34 are magnetized in a tangential direction. First, a component of the magnetic flux generated by the permanent magnets will directly link stator windings 42 across air gap 44. For example, a portion of the flux from permanent magnet 34C will link stator windings 42 and return through pole finger 32B. The direct linking with stator windings 42 provides the opportunity for increased electrical output. Also, the tendency for permanent magnets 34 to be demagnetized by the magnetomotive force generated in pole fingers 32 by field coil 24 is less. Take permanent magnet 34C as an example. Pole finger 32A (a pole finger of north magnetic polarity when magnetized by field coil 24) and pole finger 32B (a pole finger of south magnetic polarity when magnetized by field coil 24) will strongly tend to demagnetize a permanent magnet included therebetween which is magnetized in a purely tangential direction. Such a tendency is less where the magnetization polarity is not purely tangential, such as with permanent magnets 34.

Permanent magnets 34 can be magnetized by applying magnetic field to the magnets in the manner described as follows. To magnetize the magnets whose radially-outward surface is of south magnetic polarity, such as 34A and 34B, the north pole of the magnetizing fixture should contact the radially-outward surface of those magnets and the south pole of the magnetizing fixture should contact the rotor pole piece whose pole fingers 32 are of north magnetic polarity. Similarly, to magnetize the magnets whose radially-outward surface is of north magnetic polarity, such as 34C and 34D, the south pole of the magnetizing fixture should contact the radially-outward surfaces of those magnets and the north pole of the magnetizing fixture should contact the rotor pole piece whose pole fingers 32 are of south magnetic polarity. Because the magnetizing fixture can directly contact one the pole surfaces of the permanent magnets, most of the magnetizing flux generated by the magnetizer can go though the permanent magnets as desired and there is little 'leakage flux' which goes through the rotor hub and therefore bypasses the permanent magnets being magnetized.

Of course, permanent magnets 34 can also be magnetized prior to assembly of rotor 33. However, the magnets will be much more difficult to assemble into the rotor because the magnets will be attracted to any ferromagnetic material in their vicinity.

Preferably, two permanent magnets 34 are located adjacent each tip of a pole finger 32. This is illustrated, for example, by permanent magnets 34C and 34D and pole finger 32A. The radially outward surfaces of the two permanent magnets 34 are preferably of the same magnetic polarity of the pole finger 32 whose tip the permanent magnets are adjacent. The two permanent magnets which are adjacent to a tip of a pole finger 32 help to maximize the magnetized surface area of the rotor. That is, where the tip of a pole finger 32 has narrowed to a narrow tip, the rotor surface area which can generate electromagnetic flux linking with stator windings 42 is reduced. Placing two permanent magnets 34 on the two sides of the pole finger tip increases the area which was reduced due to the narrowing of the pole finger. The narrowing, which is not in itself preferred from the standpoint of optimizing flux linkage between the rotor and the stator, is nonetheless a typical feature in Lundell alternators due to other design considerations.

Permanent magnets 34 are manufactured to have a structure which supports magnetization with a polarity as illustrated in FIGS. 3–5 and previously discussed. If an isotropic permanent magnet material is used the direction of the magnetization axis is determined by the magnetization process. By controlling the direction of the magnetizing flux the magnetization axis of the permanent magnets can be oriented to the desired direction. If an anisotropic material is used the orientation of the magnetization axis is controlled in the manufacturing process of the permanent magnets. By controlling the direction of the applied magnetic field while the magnet is pressed the direction of the magnetization axis can be oriented to the desired direction.

Various other modifications and variations will no doubt occur to those skilled in the arts to which this invention pertains. Such variations which generally rely on the teachings through which this disclosure has advanced the art are properly considered within the scope of this invention. This disclosure should thus be considered illustrative, not limiting; the scope of the invention is instead defined by the following claims.

What is claimed is:

1. A rotor for an electrical machine, said rotor having an axis of rotation and comprising:

a first pole piece having a plurality of axially-extending first pole fingers;

a second pole piece having a plurality of axially-extending second pole fingers, said first pole fingers alternately intermeshed with said second pole fingers;

a field coil in electromagnetic communication with said first pole piece and said second pole piece which when energized magnetizes said first pole fingers and said second pole fingers;

a plurality of permanent magnets, each disposed between a first pole finger and an adjacent second pole finger and having a radially-outward surface and an adjacent tangentially-facing surface of a first magnetic polarity and having a radially-inward surface and an adjacent tangentially-facing surface of an opposite magnetic polarity.

2. A rotor as recited in claim 1, wherein said first and second pole pieces each comprise a generally disk-shaped body from which said pole fingers extend.

3. A rotor as recited in claim 2, wherein exactly two said permanent magnets are disposed between each adjacent first and second pole finger.

4. A rotor as recited in claim 3, wherein each said plurality of permanent magnets is adjacent a tip of a respective pole finger and whose radially-outward surface is of the same magnetic polarity as said respective pole finger when said respective pole finger is magnetized by said field coil.

5. A rotor as recited in claim 2, wherein each said plurality of permanent magnets is adjacent a tip of a respective pole finger and whose radially-outward surface is of the same magnetic polarity as said respective pole finger when said respective pole finger is magnetized by said field coil.

6. A rotor as recited in claim 1, wherein at least two said permanent magnets are disposed between each adjacent first and second pole finger.

7. A rotor as recited in claim 1, wherein exactly two said permanent magnets are disposed between each adjacent first and second pole finger.

8. A rotor as recited in claim 7, wherein each said plurality of permanent magnets is adjacent a tip of a respective pole finger and whose radially-outward surface is of the same magnetic polarity as said respective pole finger when said respective pole finger is magnetized by said field coil.

9. A rotor as recited in claim 1, wherein each said plurality of permanent magnets is adjacent a tip of a respective pole finger and whose radially-outward surface is of the same magnetic polarity as said respective pole finger when said respective pole finger is magnetized by said field coil.

10. A rotor for an electrical machine, said rotor having an axis of rotation and comprising:
   a first pole piece having a plurality of axially-extending first pole fingers;
   a second pole piece having a plurality of axially-extending second pole fingers, said first pole fingers alternately intermeshed with said second pole fingers;
   a field coil in electromagnetic communication with said first pole piece and said second pole piece which when energized magnetizes said first pole fingers and said second pole fingers;
   a plurality of permanent magnets, each disposed between a first pole finger and an adjacent second pole finger and having a magnetization polarity at an angle between radial direction and tangential direction with respect to said axis of rotation, but not including a radial angle or tangential angle.

11. A rotor as recited in claim 10, wherein said first and second pole pieces each comprise a generally disk-shaped body from which said pole fingers extend.

12. A rotor as recited in claim 11, wherein at least two said permanent magnets are disposed between each adjacent first and second pole finger.

13. A rotor as recited in claim 11, wherein exactly two said permanent magnets are disposed between each adjacent first and second pole finger.

14. A rotor as recited in claim 13, wherein each said plurality of permanent magnets is adjacent a tip of a respective pole finger and whose radially-outward surface is of the same magnetic polarity as said respective pole finger when said respective pole finger is magnetized by said field coil.

15. A rotor as recited in claim 11, wherein each said plurality of permanent magnets is adjacent a tip of a respective pole finger and whose radially-outward surface is of the same magnetic polarity as said respective pole finger when said respective pole finger is magnetized by said field coil.

16. A rotor as recited in claim 10, wherein at least two said permanent magnets are disposed between each adjacent first and second pole finger.

17. A rotor as recited in claim 10, wherein exactly two of said permanent magnets are disposed between each adjacent first and second pole finger.

18. A rotor as recited in claim 17, wherein each said plurality of permanent magnets is adjacent a tip of a respective pole finger and whose radially-outward surface is of the same magnetic polarity as said respective pole finger when said respective pole finger is magnetized by said field coil.

19. A rotor as recited in claim 10, wherein each said plurality of permanent magnets is adjacent a tip of a respective pole finger and whose radially-outward surface is of the same magnetic polarity as said respective pole finger when said respective pole finger is magnetized by said field coil.

20. A method of manufacturing a rotor for an electrical machine, said rotor having a first pole piece with a plurality of first axially-extending pole fingers and a second pole piece with a plurality of second axially-extending pole fingers and an axis of rotation, said method comprising:
   assembling said first pole piece and said second pole piece with said first pole fingers alternately intermeshed with said second pole fingers and at least one permanent magnet disposed between each first pole finger and an adjacent second pole finger;
   magnetizing said permanent magnets to each have a magnetization polarity with an angle between radial direction and tangential direction with respect to said axis of rotation, but not including a radial angle or tangential angle.

* * * * *